United States Patent
Feng et al.

(10) Patent No.: US 10,705,357 B2
(45) Date of Patent: Jul. 7, 2020

(54) DISPLAY SUBSTRATE, DISPLAY PANEL AND METHOD FOR REPAIRING BRIGHT SPOTS

(71) Applicants: BOE TECHNOLOGY GROUP CO., LTD., Beijing (CN); CHONGQING BOE OPTOELECTRONICS TECHNOLOGY CO., LTD., Chongqing (CN)

(72) Inventors: Xianfu Feng, Beijing (CN); Zhijun Xu, Beijing (CN); Yajun Wang, Beijing (CN); Zujiang Qin, Beijing (CN); Qiuhang Peng, Beijing (CN)

(73) Assignees: BOE TECHNOLOGY GROUP CO., LTD., Beijing (CN); CHONGQING BOE OPTOELECTRONICS TECHNOLOGY CO., LTD., Chongqing (CN)

( * ) Notice: Subject to any disclaimer, the term of this patent is extended or adjusted under 35 U.S.C. 154(b) by 55 days.

(21) Appl. No.: 16/047,569

(22) Filed: Jul. 27, 2018

(65) Prior Publication Data
US 2019/0079322 A1   Mar. 14, 2019

(30) Foreign Application Priority Data

Sep. 14, 2017   (CN) .......................... 2017 1 0826424

(51) Int. Cl.
*G02F 1/13* (2006.01)
*G02F 1/1335* (2006.01)
(Continued)

(52) U.S. Cl.
CPC ............ *G02F 1/1309* (2013.01); *G02F 1/136* (2013.01); *G02F 1/1337* (2013.01);
(Continued)

(58) Field of Classification Search
CPC ............ G02F 1/1309; G02F 1/133512; G02F 1/133514; G02F 1/1339; G02F 1/136; G02F 2201/52; G02F 1/1337
(Continued)

(56) References Cited

U.S. PATENT DOCUMENTS 6,239,856 B1   5/2001   Imura et al.
9,632,347 B2   4/2017   Huh et al.
(Continued)

FOREIGN PATENT DOCUMENTS

CN   1234523 A   11/1999
CN   100456085 C   1/2009
(Continued)

OTHER PUBLICATIONS

First Office Action dated Nov. 15, 2019 for corresponding Chinese application 201710826424.7.

*Primary Examiner* — Melissa J Koval
*Assistant Examiner* — Trung Nguyen
(74) *Attorney, Agent, or Firm* — Nath, Goldberg & Meyer; Joshua B. Goldberg

(57) ABSTRACT

A display substrate including a base substrate and an optical functional layer provided on the base substrate. The optical functional layer includes a black matrix providing a plurality of first shading strips and a plurality of second shading strips. The plurality of first shading strips intersect with the plurality of second shading strips so as to divide the display substrate into a plurality of pixel units. A thickness of the first shading strips is different from that of the second shading strips.

13 Claims, 4 Drawing Sheets

(51) Int. Cl.
    *G02F 1/1339*     (2006.01)
    *G02F 1/136*     (2006.01)
    *G02F 1/1337*     (2006.01)

(52) U.S. Cl.
    CPC ...... *G02F 1/1339* (2013.01); *G02F 1/133512* (2013.01); *G02F 1/133514* (2013.01); *G02F 2201/52* (2013.01)

(58) Field of Classification Search
    USPC .............. 324/600, 500, 760.01–763.01, 770; 345/55, 87, 103, 104; 438/138, 30
    See application file for complete search history.

(56) References Cited

U.S. PATENT DOCUMENTS

| | | | |
|---|---|---|---|
| 9,733,534 B2 | 8/2017 | Lin et al. | |
| 9,761,632 B2 | 9/2017 | Li et al. | |
| 2003/0190419 A1* | 10/2003 | Katagami | B41J 2/2114 427/240 |
| 2016/0124526 A1* | 5/2016 | Chou | G06F 3/0395 362/311.02 |

FOREIGN PATENT DOCUMENTS

| | | |
|---|---|---|
| CN | 102650750 A | 8/2012 |
| CN | 103995380 A | 8/2014 |
| CN | 104133325 A | 11/2014 |
| JP | H112808 A | 1/1999 |
| JP | 2014102445 A | 6/2014 |
| KR | 20050008284 A | 1/2005 |
| TW | 201602648 A | 1/2016 |

\* cited by examiner

DISPLAY SUBSTRATE, DISPLAY PANEL AND METHOD FOR REPAIRING BRIGHT SPOTS

CROSS-REFERENCE TO RELATED APPLICATION

The present application claims priority to Chinese Patent Application No. 201710826424.7, filed on Sep. 14, 2017, the disclosure of which is hereby incorporated by reference in its entirety.

TECHNICAL FIELD

The present application relates to the field of display technology, and in particular, to a display substrate, a display panel including the display substrate, and a method for repairing bright spots in a display panel.

BACKGROUND

As for a display panel, a bright spot defect is a defect which is apt to be perceived by human eyes. A bright spot is generally eliminated by making the bright spot become a dark spot.

There are various methods for eliminating the bright spot. However, the existing bright spot repairing methods have either a complicated process or an unsatisfactory repairing effect.

Therefore, how to eliminate the bright spot effectively by a simple process becomes a technical problem to be solved urgently in the art.

SUMMARY

The present disclosure provides a display substrate, a display panel and a method for repairing bright spots in a display panel.

According to an aspect of the present disclosure, it provides a display substrate which includes a base substrate and an optical functional layer provided on the base substrate, wherein the optical functional layer includes a black matrix, the black matrix includes a plurality of first shading strips and a plurality of second shading strips, the plurality of first shading strips intersect with the plurality of second shading strips so as to divide the display substrate into a plurality of pixel units, and a thickness of the first shading strips is larger than that of the second shading strips.

Optionally, the optical functional layer further includes a plurality of color filtering blocks, each of the pixel units is provided therein with one of the plurality of color filtering blocks, and color filtering blocks in pixel units in a length direction of a second shading strip have a same color, while color filtering blocks in pixel units in a length direction of a first shading strip have different colors.

Optionally, the black matrix is made of a positive photoresist material or a negative photoresist material.

Optionally, at least one of the color filtering blocks covers a part of a shading strip adjacent thereto.

Optionally, the color filtering blocks with the same colors provided in the length direction of the second shading strip are of a bar-shaped integrated structure.

Optionally, the display substrate further includes a common electrode layer which is provided on a surface of the optical functional layer so that the optical functional layer is located between the base substrate and the common electrode layer.

Optionally, the thickness of the second shading strips is between 1.15 µm and 1.3 µm.

Optionally, the thickness of the first shading strips is approximately 1.5 times of the thickness of the second shading strips.

According to an aspect of the present disclosure, it provides a display panel which includes an array substrate and a display substrate provided opposite to the array substrate, wherein the array substrate is provided thereon with a plurality of gate lines and a plurality of data lines, orthographic projections of the plurality of first shading strips on the array substrate are overlapped with the plurality of gate lines of the array substrate, and orthographic projections of the plurality of second shading strips on the array substrate are overlapped with the plurality of data lines of the array substrate.

Optionally, the display panel further includes a plurality of spacers which are provided between the array substrate and the display substrate, and orthographic projections of the plurality of spacers on the base substrate are overlapped with an orthographic projection of the black matrix on the base substrate.

Optionally, the orthographic projections of the plurality of spacers on the base substrate are overlapped with the orthographic projections of the plurality of first shading strips on the base substrate.

According to an aspect of the present disclosure, it provides a method for repairing bright spots in the above-mentioned display panel. The method includes: irradiating, by using a laser, a first shading strip adjacent to a pixel unit which has become a bright spot, so that a part of a material of the black matrix is melted and covers the pixel unit which has become a bright spot.

Optionally, the step of irradiating a first shading strip includes irradiating a side of the first shading strip adjacent to the pixel unit which has become a bright spot.

Optionally, the first shading strip is irradiated by using laser beams with different energies so that a part of the material of the black matrix is melted and covers the pixel unit which has become a bright spot.

BRIEF DESCRIPTION OF THE FIGURES

The drawings, which constitute a part of the specification, are provided for purposes of further understanding the present disclosure and illustrating the present disclosure along with the specific implementations below, without limiting the present disclosure. In the drawings.

DETAILED DESCRIPTION

The specific embodiments of the present disclosure will be described in detail below in conjunction with the drawings. It should be appreciated that the specific embodiments as described herein are provided for illustrating and explaining the present disclosure only, instead of limiting the present disclosure.

Figure 1:
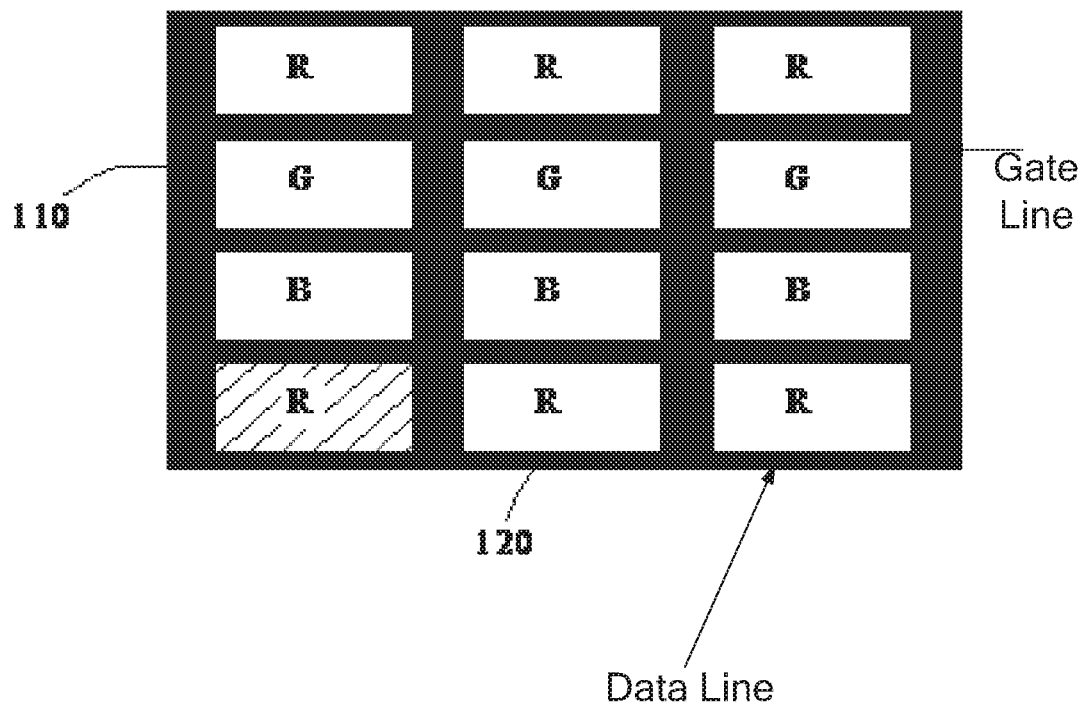
FIG. 1 is a top view of a display substrate provided by the present disclosure.
Figure 2:
FIG. 2 is a side view of a black matrix in the display substrate provided by the present disclosure.

In an embodiment, provided is a display substrate which includes a base substrate 130 and an optical functional layer on the base substrate 130. The optical functional layer includes a black matrix. As shown in FIG. 1, the black matrix includes a plurality of first shading strips 110 and a plurality of second shading strips 120. The first shading strips 110 intersect with the second shading strips 120 so as to divide the display substrate into a plurality of pixel units. As shown in FIG. 2, a thickness of the first shading strips 110 is different from that of the second shading strips 120.

The display substrate is applicable to a display panel. If the display panel has the bright spot defect, a part of the black matrix adjacent to the pixel unit in which the bright spot exists may be heated so as to be melted, and the melted material covers the pixel unit having the bright spot to make the bright spot become a dark spot (e.g., as shown in FIG. 1, the pixel unit R located at the lower left corner is covered by the black matrix and becomes a dark spot). In the present disclosure, since the thickness of the first shading strip 110 is different from that of the second shading strip 120, one of the first and second shading strips which has a larger thickness may be heated when it is required to heat the black matrix. Although a part of the material of one of the first and second shading strips is lost after being heated, it still has enough thickness to shade a part of the array substrate corresponding to the part of the shading strip and avoid light leakage. Moreover, since the one of the first and second shading strips which has a larger thickness has a larger quantity of the black-matrix material, more black-matrix material may cover the pixel unit having the bright spot when the black matrix is heated and melted, ensuring that the pixel unit having the bright spot is repaired to a dark spot.

Specifically, when a first shading strip is heated, a nanoscale laser may be focused on and melt the first shading strip, and after the melted black-matrix material covers the corresponding pixel unit, the melted black-matrix material may be re-solidified when it cools down; when a second shading strip is heated, a nanoscale laser may be focused on and melt the second shading strip, and after the melted black-matrix material covers the corresponding pixel unit, the melted black-matrix material may be re-solidified when it cools down. The nanoscale laser may be focused on a shading strip precisely, so as to heat and melt the shading strip.

It should be noted that the display substrate is applicable to a display panel. The display panel includes gate lines and data lines that are intersected. In an embodiment, the first shading strips are used for shading the gate lines, and the second shading strips are used for shading the data lines.

The display substrate provided by the present disclosure may be a color filter substrate; accordingly, the functional layer further includes a plurality of color filtering blocks, and each pixel unit is provided therein with one of the color filtering blocks.

In the specific implementation as shown in FIG. 1, red filtering blocks R, green filtering blocks G and blue filtering blocks B are provided on the display substrate. Obviously, the present disclosure is not limited thereto. Filtering blocks of other colors may be provided on the display substrate.

Figure 3:
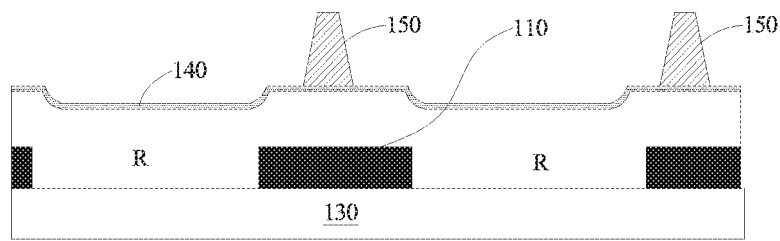
FIG. 3 is a side view of a display substrate provided by the present disclosure.

In an embodiment, color filtering blocks in any two adjacent pixel units in a length direction of a second shading strip 120 have a same color. Color filtering blocks in any two pixel units which are adjacent to each other in a length direction of a first shading strip 110 have different colors. That is to say, in FIG. 1, a plurality of color filtering blocks are arranged in multiple rows and multiple columns, and the color filtering blocks in a same row have a same color, i.e., the color filtering blocks in a same row have a same color and the color filtering blocks in different rows have different colors. In a same column, any two adjacent color filtering blocks have different colors. For the purpose of a convenient fabricating, the color filtering blocks in the same row may be integrated (i.e., a plurality of color filtering blocks may be formed as the bar-shaped integrated structure as shown in FIG. 3).

When fabricating the display substrate including the color filter layer, the black matrix is formed first, and then the color filtering blocks are formed. Generally, at least one of the filtering blocks covers a part of the shading strip adjacent thereto.

When fabricating the color filtering blocks, the filtering blocks with different colors are fabricated respectively. For example, multiple rows of red filtering blocks may be fabricated first, and then multiple rows of green filtering blocks and multiple rows of blue filtering blocks are fabricated successively.

Since the color filtering blocks in a same row have a same color, the filtering material for forming the color filtering blocks may cover different first shading strips in a same row. The overlapping with the first shading strips may lead to a first height difference at the color filtering blocks in a pixel unit.

Since the adjacent color filtering blocks in a same column have different colors, the color filtering blocks cannot cover the second shading strips completely. A part of a color filtering block is overlapped on a second shading strip so as to lead to a second height difference, i.e., a step, at the color filtering blocks in a pixel unit.

Figure 5A:
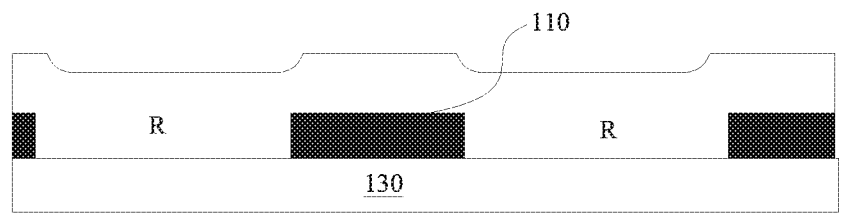
FIG. 5a is a schematic diagram of forming a color filtering block according to an embodiment, in which a first shading strip is shown.
Figure 5B:
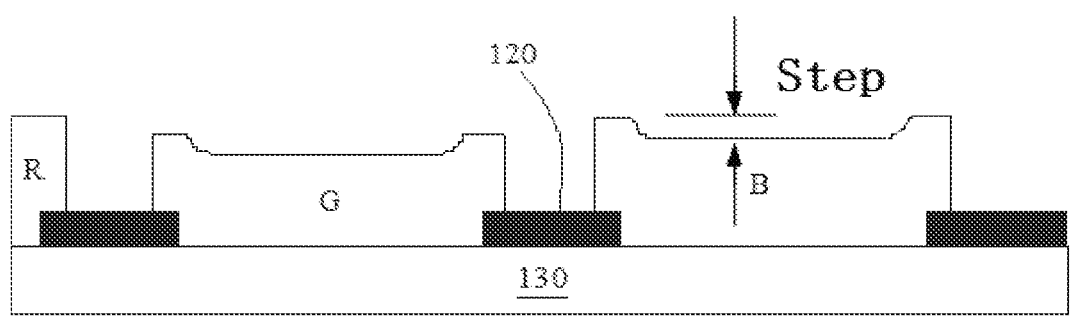
FIG. 5b is a schematic diagram of a second shading strip according to an embodiment.

As described above, the first shading strips are used for covering the gate lines of the display panel, and the second shading strips are used for covering the data lines of the display panel. The height difference due to overlapping of the second shading strips 120 with the color filtering blocks is the step, as shown in FIG. 5b.

In the display substrate, if the thickness of the second shading strip is larger, the step may be increased, thereby affecting the subsequent fabricating process for an alignment layer and ultimately generating adverse effects such as an image sticking. To decrease the step, the thickness of the second shading strip may be set to be smaller than that of the first shading strip. That is to say, compared to the related art, in the present disclosure, the thickness of the second shading strip is the same as that of the second shading strip in the related art while the thickness of the first shading strip is increased, thereby decreasing the probability of the presence of the image sticking in the display panel.

The display substrate provided by the present disclosure may be applied to a TN-type liquid crystal display panel. Specifically, as shown in FIG. 3, the display substrate further include a common electrode layer 140 which is provided on a surface of the optical functional layer so that the optical functional layer is located between the base substrate 130 and the common electrode layer 140.

In an embodiment, the display substrate is applied to a TN-type liquid crystal display panel. To maintain the cell gap of the liquid crystal display panel, a plurality of spacers are provided between the array substrate and the display substrate of the display panel. The spacers 150 are provided on the common electrode layer 140, and the orthographic projections of the plurality of spacers 150 on the base substrate are overlapped with the orthographic projection of the black matrix on the base substrate.

In an embodiment, in order to save materials, the spacers 150 are provided at positions corresponding to the first shading strips 110. Specifically, the orthographic projections of the plurality of the spacers on the base substrate are overlapped with the orthographic projections of the plurality of first shading strips on the base substrate. As described above, the thickness of the first shading strips 110 is larger than that of the second shading strips 120. Therefore, the height of the spacers 150 may be decreased by providing the spacers 150 on the first shading strips 110, and thereby the purpose of saving the materials is achieved. For mass production of the display panels, the amount of the saved materials is very considerable.

In the present disclosure, the thickness of the black matrix is not particularly limited as long as it can achieve better shading effect and can repair the bright spots by the heating process. In an embodiment, for example, the thickness of the second shading strips 120 is between 1.15 μm and 1.3 μm. The thickness of the first shading strips 110 is approximately 1.5 times of that of the second shading strips 120.

In an embodiment, provided is a display panel which includes an array substrate and a display substrate provided opposite to the array substrate, the array substrate includes a plurality of gate lines and a plurality of data lines, the display substrate is the display substrate provided by the present disclosure; orthographic projections, on the array substrate, of the plurality of first shading strips located on the display substrate are overlapped with the plurality of gate lines of the array substrate; and orthographic projections, on the array substrate, of the plurality of second shading strips located on the display substrate are overlapped with the plurality of data lines of the array substrate.

As described above, if there is a bright spot in the display panel, the bright spot may be repaired to a dark spot by heating and melting the black matrix. This is a simple process and has a high repairing success rate.

As described above, the display panel may include the TN-type liquid crystal display panel, and thus the display panel further includes a liquid crystal material layer between the array substrate and the display substrate.

The display panel may be an electronic device such as a mobile, a tablet, a display, a television, a GPS navigator, and so on.

As described above, since the thickness of the second shading strips used for covering the data line remains unchanged compared with the thickness of the second shading strips in the related art, the second height difference (i.e., the step) of the pixel units of the display panel remains unchanged, and thereby the probability of the presence of the image sticking in the display panel may be decreased.

In an embodiment, provided is a fabricating method of a display substrate. The fabricating method of a display substrate includes: providing a base substrate; and forming an optical functional layer on the base substrate. The step of forming an optical functional layer on the base substrate includes: coating a black-matrix material layer, and patterning the black-matrix material layer by a photolithography process to obtain a black matrix. The black matrix includes a plurality of first shading strips and a plurality of second shading strips. The first shading strips intersect with the second shading strips so as to divide the cell substrate into a plurality of pixel units, and a thickness of the first shading strips is different from that of the second shading strips.

Figure 4A:
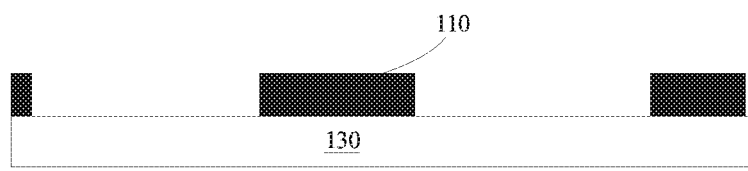
FIG. 4a is a schematic diagram of forming a black matrix on a base substrate in a process of fabricating the display substrate, in which a first shading strip is shown.
Figure 4B:
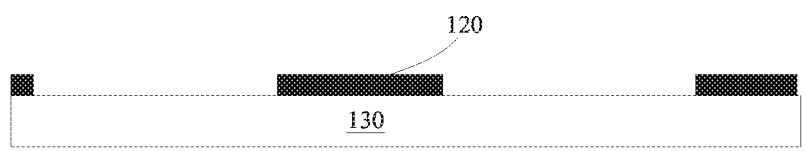
FIG. 4b is a schematic diagram of a second shading strip according to an embodiment.

As shown in FIGS. 4a and 4b, the black matrix formed on the base substrate 130 includes the first shading strips 110 having a larger thickness and the second shading strips 120. Obviously, the present disclosure is not limited thereto, and the black matrix may be configured that the thickness of the first shading strips 110 is smaller than that of the second shading strips 120.

In an embodiment, in order to simplify the fabricating method, a half-tone mask is utilized in the step of pattering the black-matrix material layer by the photolithography process.

If the black-matrix material layer is formed by a negative photoresist material, the black-matrix material layer may be patterned by using a first half-tone mask. The first half-tone mask includes a first transparent region, a first semitransparent region and a first opaque region. A position of the first transparent region corresponds to one of the first shading strip and the second shading strip which has a larger thickness, a position of the first semitransparent region corresponds to one of the first shading strip and the second shading strip which has a smaller thickness, and a position of the first opaque region corresponds to the pixel units.

If the black-matrix material layer is formed by a positive photoresist material, the black-matrix material layer may be patterned by using a second half-tone mask. The second half-tone mask includes a second transparent region, a second semitransparent region and a second opaque region. A position of the second transparent region corresponds to the pixel units, a position of the second semitransparent region corresponds to one of the second shading strip and the second shading strip which has a smaller thickness, and a position of the second opaque region corresponds to one of the second shading strip and the second shading strip which has a larger thickness.

As described above, the display substrate may be a color filter substrate, and thus, the step of forming the optical functional layer on the base substrate further includes: forming a color filter layer which includes a plurality of color filtering blocks, each of the pixel units is provided therein with one of the color filtering blocks. FIGS. 5a and 5b show the position relationship between the color filtering blocks and the black matrix.

The display substrate may be applied to the TN-type liquid crystal display panel, and thus the fabricating method of the display substrate further includes: forming a common electrode layer on the optical functional layer.

Figure 6A:
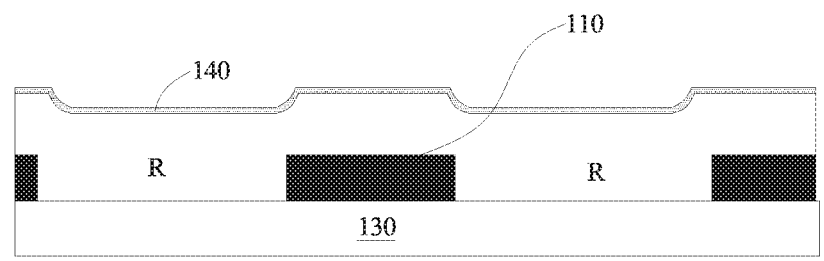
FIG. 6a is a schematic diagram of forming a common electrode layer according to an embodiment, in which a first shading strip is shown.
Figure 6B:
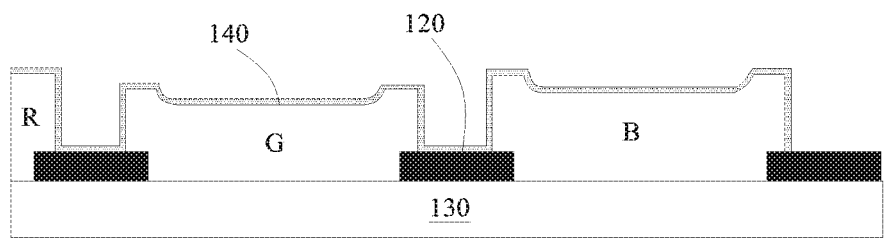
FIG. 6b is a schematic diagram of a second shading strip according to an embodiment.

As shown in FIGS. 6a and 6b, the common electrode layer 140 covers the black matrix and the color filter layer.

In an embodiment, the thickness of the first shading strip is larger than that of the second shading strip.

When the display substrate is applied to the TN-type liquid crystal display panel, the fabricating method of the display substrate further includes: forming a plurality of spacers on the common electrode layer, wherein the positions of the spacers correspond to the positions of the first shading strips, that is, orthographic projections of the plurality of spacers on the base substrate is overlapped with the orthographic projections of the plurality of first shading strips on the base substrate.

Disposing the spacers at the positions corresponding to the first shading strips may decrease the height of the spacers, which saves the materials and thus reduces the cost of the display substrate.

In an embodiment, provided is a method for repairing bright spots in a display panel, wherein the display panel includes the above display substrate provided by the present disclosure, and the method includes: irradiating one of the first shading strip and the second shading strip which has a larger thickness (for example, a first shading strip), adjacent to a pixel unit which has become a bright spot by using a laser, so that a part of a material of the black matrix is melted and covers the pixel unit which has become a bright spot. Specifically, the shading strip which has a larger thickness may be irradiated by using laser beams with different energies so that a part of the material of the black matrix is melted and covers the pixel unit which has become a bright spot.

In the present disclosure, all the shading strips having a larger thickness adjacent to the pixel unit which has become a bright spot may be irradiated so that the melted material in the shading strips having a larger thickness may cover the pixel unit which has become a bright spot and make it become a dark spot.

In an embodiment, in order to prevent the melted black-matrix material from covering a pixel unit which is not a bright spot, a side, close to the pixel unit which has become a bright spot, of the first shading strip adjacent to the pixel unit which has become a bright spot is irradiated by using the laser.

It will be appreciated that the above implementations are exemplary implementations simply for illustrating the principle of the present disclosure. However, the present disclosure is not limited thereto. An ordinary person skilled in the art may make various modifications and variations without departing from the spirit and scope of the present disclosure. The present disclosure is intended to encompass these modifications and variations.

What is claimed is:

1. A display substrate, comprising: a base substrate and an optical functional layer provided on the base substrate, wherein the optical functional layer comprises a black matrix and a plurality of color filtering blocks, the black matrix comprises a plurality of first shading strips and a plurality of second shading strips, the plurality of first shading strips intersect with the plurality of second shading strips so as to divide the display substrate into a plurality of pixel units, each of the pixel units is provided therein with one of the plurality of color filtering blocks, and a thickness of the first shading strips is larger than that of the second shading strips,
    wherein each of the first and second shading strips is configured to shield light and avoid light leakage, and the black matrix is made of a positive photoresist material or a negative photoresist material.
2. The display substrate of claim 1, wherein the color filtering blocks in pixel units in a length direction of the second shading strip have a same color, while the color filtering blocks in pixel units in a length direction of the first shading strip have different colors.
3. The display substrate of claim 2, wherein,
    at least one of the color filtering blocks covers a part of a shading strip adjacent thereto.
4. The display substrate of claim 3, wherein the color filtering blocks having a same color and being arranged in the length direction of the second shading strip are formed as one piece by a single color filtering block.
5. The display substrate of claim 1, wherein the display substrate further comprises a common electrode layer which is provided on a surface of the optical functional layer so that the optical functional layer is located between the base substrate and the common electrode layer.
6. The display substrate of claim 1, wherein the thickness of the second shading strips is between 1.15 μm and 1.3 μm.
7. The display substrate of claim 1, wherein the thickness of the first shading strips is approximately 1.5 times of the thickness of the second shading strips.
8. A display panel, comprising an array substrate and a display substrate provided opposite to the array substrate, wherein the array substrate is provided thereon with a plurality of gate lines and a plurality of data lines, the display substrate is the display substrate of claim 1, orthographic projections of the plurality of first shading strips on the array substrate are overlapped with the plurality of gate lines of the array substrate, and orthographic projections of the plurality of second shading strips on the array substrate are overlapped with the plurality of data lines of the array substrate.
9. The display panel of claim 8, further comprising a plurality of spacers which are provided between the array substrate and the display substrate, wherein
    orthographic projections of the plurality of spacers on the base substrate are overlapped with an orthographic projection of the black matrix on the base substrate.
10. The display panel of claim 9, wherein the orthographic projections of the plurality of spacers on the base substrate are overlapped with the orthographic projections of the plurality of first shading strips on the base substrate.
11. A method for repairing bright spots in a display panel comprising the display substrate of claim 1, comprising:
    irradiating, by using a laser, a first shading strip adjacent to a pixel unit which has become a bright spot, so that part of a material of the black matrix is melted and covers the pixel unit which has become a bright spot.
12. The method of claim 11, wherein the step of irradiating a first shading strip comprises irradiating a side of the first shading strip adjacent to the pixel unit which has become a bright spot.
13. The method of claim 12, wherein the step of irradiating a first shading strip comprises irradiating the first shading strip by using laser beams with different energies so that a part of the material of the black matrix is melted and covers the pixel unit which has become a bright spot.

* * * * *